United States Patent
Suzuki et al.

(10) Patent No.: US 8,660,151 B2
(45) Date of Patent: Feb. 25, 2014

(54) ENCODING SYSTEM AND ENCODING APPARATUS

(75) Inventors: Hidetoshi Suzuki, Kanagawa (JP); Kazufumi Watanabe, Kanagawa (JP); Eiko Sone, Kanagawa (JP); Masayoshi Kubozono, Kanagawa (JP); Masashi Takada, Kanagawa (JP)

(73) Assignee: NTT Electronics Corporation (JP)

( * ) Notice: Subject to any disclaimer, the term of this patent is extended or adjusted under 35 U.S.C. 154(b) by 190 days.

(21) Appl. No.: 13/497,898

(22) PCT Filed: Sep. 22, 2010

(86) PCT No.: PCT/JP2010/066399
§ 371 (c)(1),
(2), (4) Date: Mar. 23, 2012

(87) PCT Pub. No.: WO2011/037133
PCT Pub. Date: Mar. 31, 2011

(65) Prior Publication Data
US 2012/0207182 A1    Aug. 16, 2012

(30) Foreign Application Priority Data
Sep. 28, 2009    (JP) ................ 2009-222500

(51) Int. Cl.
*H04J 3/06*    (2006.01)
*H04J 3/02*    (2006.01)

(52) U.S. Cl.
USPC .......................................... 370/503; 370/537

(58) Field of Classification Search
USPC .................... 370/503, 509, 512, 516, 537
See application file for complete search history.

(56) References Cited

U.S. PATENT DOCUMENTS

| 4,779,275 | A * | 10/1988 | Yoshimoto ............... 714/775 |
| 6,870,861 | B1 * | 3/2005 | Negishi et al. ............ 370/537 |
| 7,735,111 | B2 * | 6/2010 | Michener et al. .......... 725/146 |
| 2006/0045020 | A1 * | 3/2006 | Picco et al. ............... 370/249 |

FOREIGN PATENT DOCUMENTS

| JP | 11-112451 | 4/1999 |
| JP | 2002-208904 | 7/2002 |
| JP | 2003-289540 | 10/2003 |
| JP | 2005-130065 | 5/2005 |

OTHER PUBLICATIONS http://nhkitec.com/008gijyutu/007/index.html.
International Search Report, PCT Patent Application No. PCT/JP2010/066399, mailed Oct. 19, 2010.

* cited by examiner

*Primary Examiner* — Hong Cho
(74) *Attorney, Agent, or Firm* — Kilpatrick Townsend & Stockton LLP

(57) ABSTRACT

An encoding apparatus 2 includes: an encoding unit 21 that encodes and multiplexes a video signal V2, an audio signal A2 and a data signal D2 to be given to the encoding apparatus 2; a timer 22 that outputs time information T2; a timer adjusting unit 23 that adjusts the timer 22 so that the time information T2 and time information T1 within a multiplexed stream S1 outputted from an encoding apparatus 1 are synchronized with each other; and a multiplexing unit 24 that multiplexes the multiplexed stream S1, an encoded stream S21 outputted from the encoding unit 21 and the time information T2, and outputs the resultant multiplexed stream and information as output of the encoding apparatus 2. Third and subsequent encoding apparatus are configured to have the same configuration as that of the encoding apparatus 2.

4 Claims, 3 Drawing Sheets

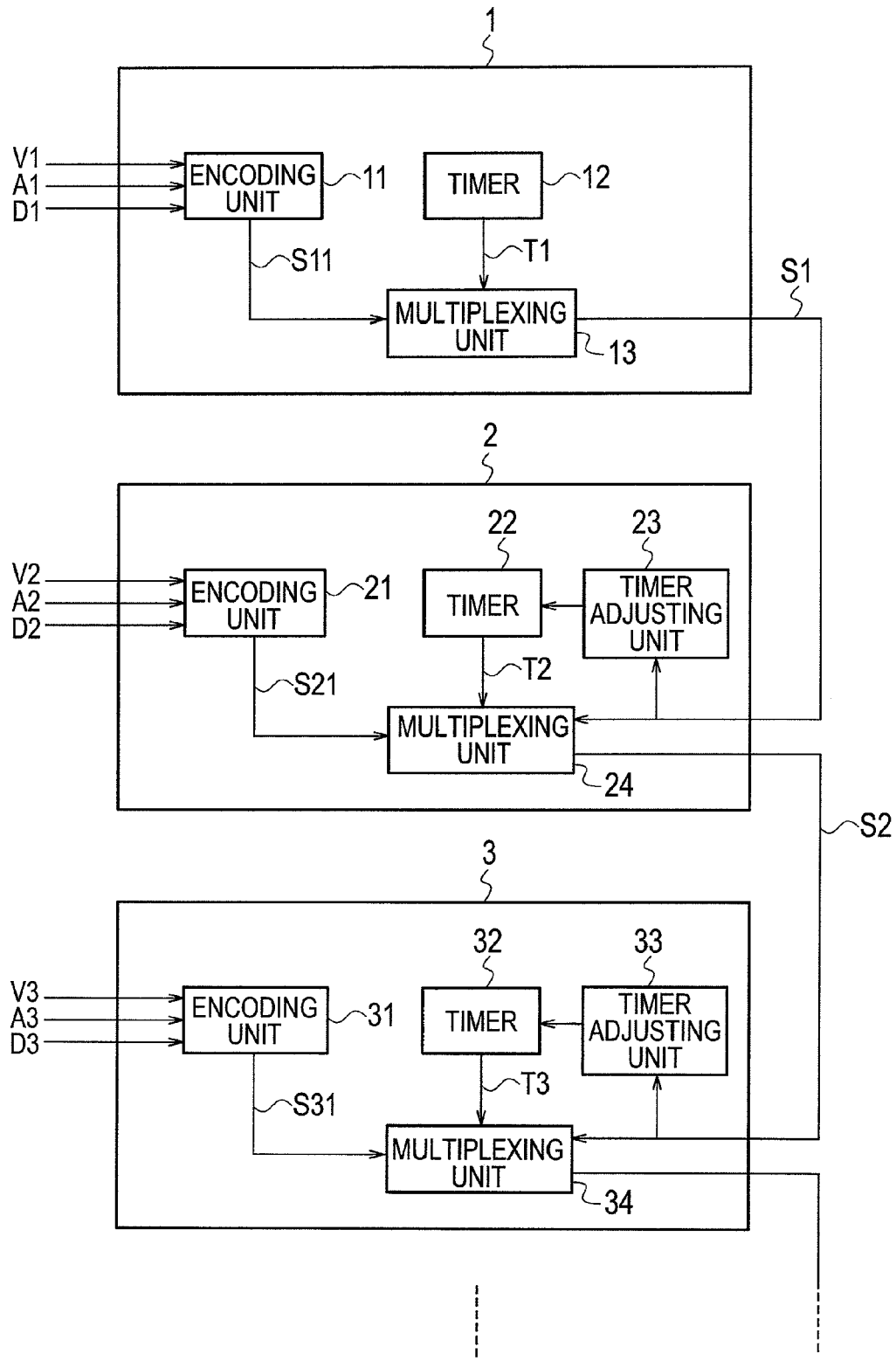

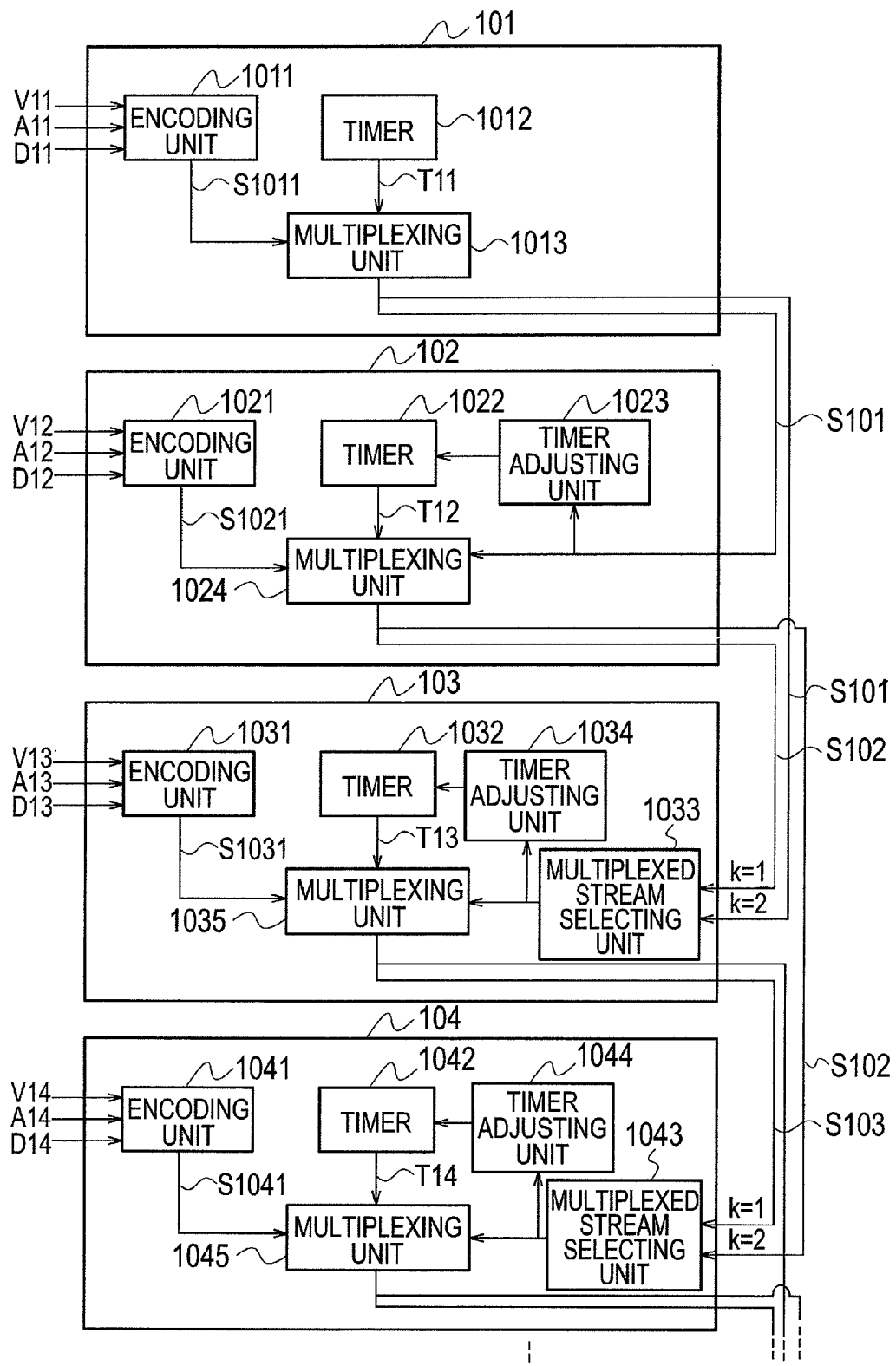

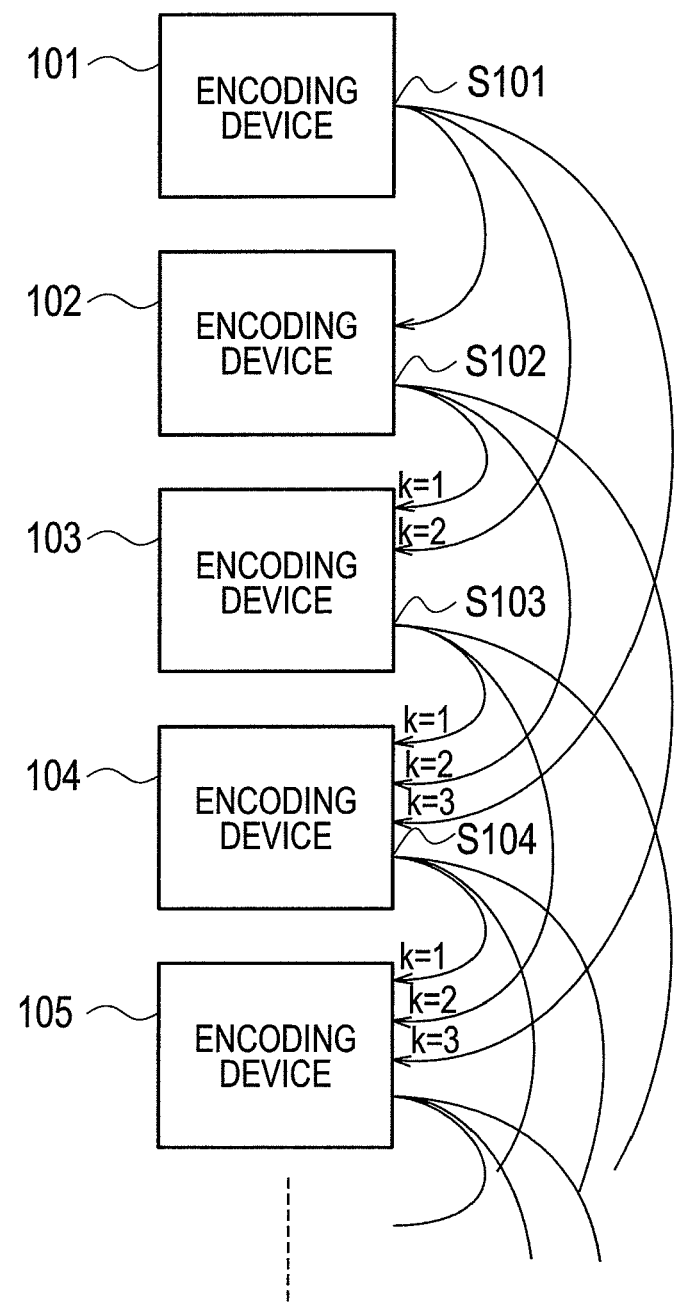

ENCODING SYSTEM AND ENCODING APPARATUS

This application is a national stage application of PCT/JP2010/066399 which claims priority to Japanese Application No. 2009-222500, both of which are incorporated herein by reference.

TECHNICAL FIELD

The present invention relates to an encoding system and an encoding apparatus capable of multiplexing streams and of flexibly coping with the extension and reduction of the system.

BACKGROUND ART

In a broadcasting system such as terrestrial digital broadcasting, mobile broadcasting (broadcasting for mobile terminals), and IPTV (services that distribute digital television broadcasts by utilizing IP (Internet Protocol)), an encoding apparatus allocated to each program encodes and multiplexes the video signal, audio signal, and data signal of the program and outputs a stream. When broadcasting a plurality of programs simultaneously, the streams are multiplexed by a multiplexing device and then a final stream is broadcasted.

PRIOR ART DOCUMENTS

Patent Documents

Non-Patent Document 1: Development system: Digital broadcasting system, [online], NHK ITEC Inc., [searched on Sep. 16, 2009], Internet <URL: http://nhkitec.com/008gijyutu/007/index.html>

SUMMARY OF THE INVENTION

Problems to be Solved

Multiplexing devices are able to multiplex streams in the number corresponding to their capabilities.

For example, suppose that since the number of programs is small at present, a multiplexing device with low capability corresponding to the small number is introduced into a broadcasting system. Then, if the number of programs increases in the future, the multiplexing device is no longer capable of multiplexing the streams because the number of streams to be multiplexed is too large.

On the other hand, an encoding apparatus with high capability is expensive and this may prevent such an encoding apparatus from being introduced easily in advance for the future. Further, even if introduced, such high capability will be wasteful unless the number of programs increases.

This results entirely from the fact that conventional multiplexing devices are not able to flexibly cope with the extension and reduction of the system.

The present invention has been made in view of the above-mentioned problems and an object thereof is to provide an encoding system and an encoding apparatus capable of multiplexing streams and of flexibly coping with the extension and reduction of the system.

Solution to the Problems

In order to solve the above-mentioned problems, an encoding system according to a first aspect of the present invention comprises a plurality of encoding apparatuses, which are set in order, characterized in that a first encoding apparatus of the plurality of encoding apparatuses includes: a first encoding unit that encodes signals; a first timer that outputs time information; and a multiplexing unit that multiplexes an encoded stream outputted from the first encoding unit and the time information outputted from the first timer, to output the resultant multiplexed stream as output of the first encoding apparatus, and in that an i-th (where $2 \leq i$) encoding apparatus of the plurality of encoding apparatuses includes: an i-th encoding unit that encodes signals; an i-th timer that outputs time information; a timer adjusting unit that adjusts the i-th timer so that the time information outputted from the i-th timer and the time information within a multiplexed stream outputted from an (i−1)-th encoding apparatus of the plurality of encoding apparatuses are synchronized with each other; and a multiplexing unit that multiplexes the multiplexed stream outputted from the (i−1)-th encoding apparatus, an encoded stream outputted from the i-th encoding unit and the time information outputted from the i-th timer, to output the resultant multiplexed stream as output of the i-th encoding apparatus.

An encoding apparatus according to the first aspect of the present invention is characterized by comprising: an encoding unit that encodes signals; a timer that outputs time information; a timer adjusting unit that adjusts the timer so that the time information outputted from the timer and the time information within a multiplexed stream input from outside are synchronized with each other; and a multiplexing unit that multiplexes the multiplexed stream to be input, an encoded stream outputted from the encoding unit and the time information outputted from the timer, to output the resultant multiplexed stream.

An encoding system according to a second aspect of the present invention comprises a plurality of encoding apparatuses, which are set in order, characterized in that a first encoding apparatus includes: a first encoding unit that encodes signals; a first timer that outputs time information; and a first multiplexing unit that multiplexes an encoded stream outputted from the first encoding unit and the time information outputted from the first timer, to output the resultant multiplexed stream as output of the first encoding apparatus, in that a second encoding apparatus of the plurality of encoding apparatuses includes: a second encoding unit that encodes signals; a second timer that outputs time information; a timer adjusting unit that adjusts the second timer so that the time information outputted from the second timer and time information within a multiplexed stream outputted from an first encoding apparatus of the plurality of encoding apparatuses are synchronized with each other; and a second multiplexing unit that multiplexes the multiplexed stream outputted from the first encoding apparatus, an encoded stream outputted from the second encoding unit and the time information outputted from the second timer, to output the resultant multiplexed stream as output of the second encoding apparatus, and in that a j-th (where $3 \leq j$) encoding apparatus of the plurality of encoding apparatuses includes: a j-th encoding unit that encodes signals; a j-th timer that outputs time information; a j-th multiplexed stream selecting unit that selects and outputs the multiplexed stream corresponding to the smallest k from among multiplexed streams outputted from (j−k)-th (where k=1, ..., n, n is not less than 2) encoding apparatus of the plurality of encoding apparatuses; a j-th timer adjusting unit that adjusts the j-th timer so that the time information outputted from the j-th timer and time information within the multiplexed stream outputted from the j-th multiplexed stream selecting unit are synchronized with each other; and a j-th multiplexing unit that multiplexes the multiplexed stream outputted from the j-th multiplexed stream selecting unit, an encoded stream outputted from the j-th encoding unit and the time information outputted from the j-th timer, to output the resultant multiplexed stream as output of the j-th encoding apparatus.

An encoding apparatus according to the second aspect of the present invention is characterized by comprising: an encoding unit that encodes signals; a timer that outputs time information; a multiplexed stream selecting unit that selects and outputs one multiplexed stream according to priority determined in advance from among a plurality of multiplexed streams input from outside; a timer adjusting unit that adjusts the timer so that the time information outputted from the timer and the time information within the multiplexed stream outputted from the multiplexed stream selecting unit are synchronized with each other; and a multiplexing unit that multiplexes the multiplexed stream outputted from the multiplexed stream selecting unit, an encoded stream outputted from the encoding unit and the time information outputted from the timer, to output the resultant multiplexed stream.

Effects of the Invention

According to the present invention, it is possible to multiplex streams and to flexibly extend and reduce a system.

BRIEF DESCRIPTION OF THE DRAWINGS

FIG. 1 is a diagram showing a configuration of an encoding system and encoding apparatuses thereof according to a first embodiment.

FIG. 2 is a diagram showing a configuration of an encoding system and encoding apparatuses thereof according to a second embodiment.

FIG. 3 is a diagram showing paths of multiplexed streams in an encoding system according to a modified example of the second embodiment.

EMBODIMENTS OF THE INVENTION

Some embodiments of the present invention will be explained below with reference to the accompanying drawings.

[First Embodiment]

FIG. 1 is a diagram showing a configuration of an encoding system and encoding apparatuses thereof according to a first embodiment.

The encoding system comprises a plurality of encoding apparatuses 1, 2, . . . , which are set in order.

The first encoding apparatus 1 includes an encoding unit 11 that encodes and multiplexes a video signal V1, an audio signal A1, and a data signal D1 to be given to the encoding apparatus 1, a timer 12 that outputs time information T1, and a multiplexing unit 13 that multiplexes an encoded stream S11 outputted from the encoding unit 11 and the time information T1 and outputs the multiplexed stream and information as output of the encoding apparatus 1. Ordinarily, encoding refers to performing encoding and compression. This is the same as in the case of encoding to be described later.

The second encoding apparatus 2 includes an encoding unit 21 that encodes and multiplexes a video signal V2, an audio signal A2, and a data signal D2 to be given to the encoding apparatus 2, a timer 22 that outputs time information T2, a timer adjusting unit 23 that adjusts the timer 22 so that the time information T2 and the time information T1 within a multiplexed stream S1 outputted from the encoding apparatus 1 are synchronized with each other, and a multiplexing unit 24 that multiplexes the multiplexed stream S1, an encoded stream S21 outputted from the encoding unit 21, and the time information 12 and outputs, as output of the encoding apparatus 2, the multiplexed stream and information.

The third encoding apparatus 3 includes an encoding unit 31 that encodes and multiplexes a video signal V3, an audio signal A3, and a data signal D3 to be given to the encoding apparatus 3, a timer 32 that outputs time information T3, a timer adjusting unit 33 that adjusts the timer 32 so that the time information T3 and the time information 12 within a multiplexed stream S2 outputted from the encoding apparatus 2 are synchronized with each other, and a multiplexing unit 34 that multiplexes the multiplexed stream S2, an encoded stream S31 outputted from the encoding unit 31, and the time information T3 and outputs, as output of the encoding apparatus 3, the multiplexed stream and information.

As in the case of the encoding apparatus 2 and 3, the fourth and subsequent encoding apparatuses are also configured to synchronize the time information within the multiplexed stream outputted from the encoding apparatus in the previous stage with the time information outputted from the timer of its own and to multiplex the multiplexed stream from the encoding apparatus in the previous stage, the encoded stream outputted from the encoding unit of its own, and the time information.

Each of the data signals D1, D2, D3, . . . includes setting values relating to the video signal and audio signal given to the encoding unit together with the data signal, user data, etc. This is the same in a second embodiment, to be described later.

(Operation of an Encoding System According to the First Embodiment)

In the encoding apparatus 1, the encoding unit 11 encodes and multiplexes the video signal V1, the audio signal A1, and the data signal D1. The timer 12 outputs the time information T1. The multiplexing unit 13 multiplexes the encoded stream S11 outputted from the encoding unit 11 and the time information T1 and outputs, as output of the encoding apparatus 1, the multiplexed stream and information.

In the encoding apparatus 2, the encoding unit 21 encodes and multiplexes the video signal V2, the audio signal A2, and the data signal D2. The timer 22 outputs the time information T2. The timer adjusting unit 23 adjusts the timer 22 so that the time information 12 and the time information T1 within the multiplexed stream S1 are synchronized with each other. Due to this, the time information and clock cycle agree with each other between the time information T1 and T2. The multiplexing unit 24 multiplexes the multiplexed stream S1, the encoded stream S21, and the time information 12 and outputs, as output of the encoding apparatus 2, the multiplexed stream and information.

In the encoding apparatus 3, the encoding unit 31 encodes and multiplexes the video signal V3, the audio signal A3, and the data signal D3. The timer 32 outputs the time information T3. The timer adjusting unit 33 adjusts the timer 32 so that the time information T3 and the time information 12 within the multiplexed stream S2 are synchronized with each other. Due to this, the time information and clock cycle agree with each other between the time information. The multiplexing unit 34 multiplexes the multiplexed stream S2, the encoded stream S31 outputted from the encoding unit 31, and the time information T3 and outputs, as output of the encoding apparatus 3, the multiplexed stream and information.

As in the case of the encoding apparatus 2 and 3, the fourth and subsequent encoding apparatuses also synchronize the time information within the multiplexed stream from the encoding apparatus in the previous stage with the time information outputted from the timer of its own and multiplex the multiplexed stream from the encoding apparatus in the previous stage, the encoded stream outputted from the encoding unit of its own, and the time information.

Although not shown schematically, when the multiplexed stream outputted from the encoding apparatus in the final stage arrives at the reception side, one of the plurality of streams within the multiplexed stream is decoded selectively by a decoder and the video and voice are reproduced.

Consequently, according to the encoding system of the first embodiment, when it is desired to increase the number of videos and voices, it is sufficient to additionally provide the encoding apparatus in the post stage of the encoding apparatus in the final stage. On the other hand, when it is desired to decrease the number of videos and voices, it is sufficient to eliminate the encoding apparatus in the order from the encoding apparatus in the final stage, and thus, it is possible to flexibly extend and reduce the system.

According to the encoding system of the first embodiment, the time information in each encoding apparatus synchronizes with another and each video and voice are reproduced based on the time information, and therefore, it is possible to prevent the videos and voices given to different encoding apparatus from being reproduced in a shifted state (occurrence of jitter is prevented). That is, it is possible to obtain the video and voice of the same quality as that when synchronization and multiplexing of time information are performed in one multiplexing device and the stream outputted from the multiplexing device is reproduced.

In the first embodiment, the vide signal, the audio signal, and the data signal are encoded and multiplexed in each encoding apparatus, but, it may also be possible to encode one of the vide signal, the audio signal, and the data signal (for example, the video signal). Further, it may also be possible to encode and multiplex two of the vide signal, the audio signal, and the data signal (for example, the video signal and the audio signal). Furthermore, the number of signals to be encoded etc. may be four or more. This is the same in the second embodiment, to be described later.

For example, it may also be possible to bundle a plurality of streams to configure a large screen video into one stream and to reproduce the stream as a large screen video on the reception side. Similarly, when receiving a 3D video, it may also be possible to bundle the streams of the right-eye video and the left-eye video into one stream and to reproduce the stream as a 3D video on the reception side. This is the same in the second embodiment described later.

In the first embodiment, it is assumed that the number of encoding apparatuses is four or more. However, the number of encoding apparatuses may be two or more. That is, the minimum encoding system includes the encoding apparatus 1 and 2.

For example, when the encoded stream S1 stops due to the failure of the encoding apparatus 1, the timer adjusting unit 23 of the encoding apparatus 2 is no longer capable of adjusting the timer 22, and therefore in such a case, the time information T2 of the timer 22 is taken as a reference and the timers of the third and subsequent encoding apparatuses are adjusted in accordance with the time information T2. Consequently, it is possible to obviate the setting to select one of the timers of the encoding apparatuses as a reference. This is also the same in the second embodiment described later.

Further, in the first embodiment, it may also be possible to cause the encoding apparatus 1 to have the same configuration as that of the encoding apparatus 2, that is, to cause each encoding apparatus to have the same configuration and to leave the timer adjusting unit unused in the encoding apparatus 1.

[Second Embodiment]

FIG. 2 is a diagram showing a configuration of an encoding system and encoding apparatuses thereof according to a second embodiment.

The encoding system comprises a plurality of encoding apparatuses 101, 102, . . . , which are set in order.

The first encoding apparatus 101 includes an encoding unit 1011 that encodes and multiplexes a video signal V11, an audio signal A11, and a data signal D11 to be given to the encoding apparatus 101, a timer 1012 that outputs time information T11, and a multiplexing unit 1013 that multiplexes an encoded stream S1011 outputted from the encoding unit 1011 and the time information T11 and outputs, as output of the encoding apparatus 101, the multiplexed stream and information.

The second encoding apparatus 102 includes an encoding unit 1021 that encodes and multiplexes a video signal V12, an audio signal A12, and a data signal D12 to be given to the encoding apparatus 102, a timer 1022 that outputs time information T12, a timer adjusting unit 1023 that adjusts the timer 1022 so that the time information T12 and the time information T11 within a multiplexed stream S101 outputted from the first encoding apparatus 101 are synchronized with each other, and a multiplexing unit 1024 that multiplexes the multiplexed stream S101, an encoded stream S1021 outputted from the encoding unit 1021, and the time information T12 and outputs, as output of the encoding apparatus 102, the multiplexed stream and information.

The third encoding apparatus 103 includes an encoding unit 1031 that encodes and multiplexes a video signal V13, an audio signal A13, and a data signal D13 to be given to the encoding apparatus 103, a timer 1032 that outputs time information T13, a multiplexed stream selecting unit 1033 that selects and outputs the multiplexed stream corresponding to the smallest k among the multiplexed streams outputted from each of (3−k)-th (here, k=1, 2) encoding apparatus, that is, the encoding apparatus 101 and 102, a timer adjusting unit 1034 that adjusts the timer 1032 so that the time information T13 and the time information within the multiplexed stream outputted from the multiplexed stream selecting unit 1033 are synchronized with each other, and a multiplexing unit 1035 that multiplexes the multiplexed stream outputted from the multiplexed stream selecting unit 1033, an encoded stream S1031 outputted from the encoding unit 1031, and the time information T13 and outputs, as output of the encoding apparatus 103, the multiplexed stream and information.

The multiplexed stream selecting unit 1033 selects and outputs one multiplexed stream from the multiplexed streams outputted from the encoding apparatus 101 and 102 according to the priority determined in advance.

The fourth encoding apparatus 104 includes an encoding unit 1041 that encodes and multiplexes a video signal V14, an audio signal A14, and a data signal D14 to be given to the encoding apparatus 104, a timer 1042 that outputs time information T14, a multiplexed stream selecting unit 1043 that selects and outputs the multiplexed stream corresponding to the smallest k among the multiplexed streams outputted from each of the (4−k)-th (here, k=1, 2) encoding apparatus, that is, the encoding apparatus 102 and 103, a timer adjusting unit 1044 that adjusts the timer 1042 so that the time information T14 and the time information within the multiplexed stream outputted from the multiplexed stream selecting unit 1043 are synchronized with each other, and a multiplexing unit 1045 that multiplexes the multiplexed stream outputted from the multiplexed stream selecting unit 1043, an encoded stream S1041 outputted from the encoding unit 1041, and the time information T14 and outputs, as output of the encoding apparatus 104, the multiplexed stream information.

The multiplexed stream selecting unit 1043 selects and outputs one multiplexed stream from the multiplexed streams outputted from the encoding apparatus 102 and 103 according to the priority determined in advance.

As in the case of the encoding apparatus 103 and 104, the j-th (5≤j) and subsequent encoding apparatuses are also configured to select the multiplexed stream corresponding to the smallest k among the multiplexed streams outputted from each of the (j−k)-th (here, k=1, 2) encoding apparatus, synchronize the time information within the selected multiplexed stream with the time information outputted from the timer of its own, and multiplex the selected multiplexed stream, the encoded stream outputted from the encoding unit of its own, and the time information.

(Operation of an Encoding System According to the Second Embodiment)

In the encoding apparatus 101, the encoding unit 1011 encodes and multiplexes the video signal V11, the audio signal A11, and the data signal D11. The timer 1012 outputs the time information T11. The multiplexing unit 1013 multiplexes the encoded stream S1011 outputted from the encoding unit 1011 and the time information T11 and outputs, as output of the encoding apparatus 101, the multiplexed stream and information.

In the encoding apparatus 102, the encoding unit 1021 encodes and multiplexes the video signal V12, the audio signal A12, and the data signal D12. The timer 1022 outputs the time information T12. The timer adjusting unit 1023 adjusts the timer 1022 so that the time information T12 and the time information T11 within the multiplexed stream S101 outputted from the encoding apparatus 101 are synchronized with each other. The multiplexing unit 1024 multiplexes the multiplexed stream S101, the encoded stream S1021 outputted from the encoding unit 1021, and the time information T12 and outputs, as output of the encoding apparatus 102, the multiplexed stream and information.

In the encoding apparatus 103, the encoding unit 1031 encodes and multiplexes the video signal V13, the audio signal A13, and the data signal D13 to be given to the encoding apparatus 103. The timer 1032 outputs the time information T13. The multiplexed stream selecting unit 1033 selects and outputs the multiplexed stream corresponding to the smallest k among the multiplexed streams outputted from each of the (3−k)-th (here, k=1, 2) encoding apparatus, that is, the encoding apparatus 101 and 102.

For example, if there is no failure in the encoding apparatus 101 and 102, then the multiplexed stream is outputted from the former, that is, the encoding apparatus 101, which is the (3−k)-th (here, k=2) encoding apparatus, and from the latter, that is, the encoding apparatus 102, which is the (3−k)-th (here, k=1) encoding apparatus, and k=1 is the smallest of k=1, 2, and therefore the multiplexed stream selecting unit 1033 selects and outputs a multiplexed stream S102 outputted from the encoding apparatus 102.

On the other hand, for example, when there is a failure in the encoding apparatus 102, then the multiplexed stream is output only from the encoding apparatus 101, which is the (3−k)-th (here, k=2) encoding apparatus of the (3−k)-th (here, k=1, 2) encoding apparatus, and k=2 is the smallest of k=2, and therefore the multiplexed stream selecting unit 1033 selects and outputs the multiplexed stream S101 outputted from the encoding apparatus 101. In this manner, the multiplexed stream selecting unit 1033 switches the multiplexed streams to be selected when detecting anomaly of the multiplexed stream to be input.

In the encoding apparatus 103, the timer adjusting unit 1034 adjusts the timer 1032 so that the time information T13 and the time information within the multiplexed stream outputted from the multiplexed stream selecting unit 1033 are synchronized with each other. The multiplexing unit 1035 multiplexes the multiplexed stream outputted from the multiplexed stream selecting unit 1033, the encoded stream S1031 outputted from the encoding unit 1031, and the time information T13 and outputs, as output of the encoding apparatus 103, the multiplexed stream and information.

In the encoding apparatus 104, the encoding unit 1041 encodes and multiplexes the video signal V14, the audio signal A14, and the data signal D14 to be given to the encoding apparatus 104. The timer 1042 outputs the time information T14. The multiplexed stream selecting unit 1043 selects and outputs the multiplexed stream corresponding to the smallest k among the multiplexed streams outputted from each of the (4−k)-th (here, k=1, 2) encoding apparatus, that is, the encoding apparatus 102 and 103.

For example, if there is no failure in the encoding apparatus 102 and 103, the multiplexed stream is outputted from the former, that is, the encoding apparatus 102, which is the (4−k)-th (here, k=2) encoding apparatus, and from the latter, that is, the encoding apparatus 103, which is the (4−k)-th (here, k=1) encoding apparatus, and k=1 is the smallest of k=1, 2, and therefore, the multiplexed stream selecting unit 1043 selects and outputs a multiplexed stream S103 outputted from the encoding apparatus 103.

On the other hand, for example, if there is a failure in the encoding apparatus 103, the multiplexed stream is output only from the encoding apparatus 102, which is the (4−k)-th (here, k=2) encoding apparatus of the (4−k)-th (here, k=1, 2) encoding apparatus, and k=2 is the smallest, and therefore, the multiplexed stream selecting unit 1043 selects and outputs the multiplexed stream S102 outputted from the encoding apparatus 102.

The timer adjusting unit 1044 adjusts the timer 1042 so that the time information T14 and the time information within the multiplexed stream outputted from the multiplexed stream selecting unit 1043 are synchronized with each other. The multiplexing unit 1045 multiplexes the multiplexed stream outputted from the multiplexed stream selecting unit 1043, the encoded stream S1041 outputted from the encoding unit 1041, and the time information T14 and outputs, as output of the encoding apparatus 104, the multiplexed stream and information.

As in the case of the encoding apparatus 103 and 104, the j-th (5≤j) and subsequent encoding apparatuses also select the multiplexed stream corresponding to the smallest k among the multiplexed streams outputted from each of the (j−k)-th (here, k=1, 2) encoding apparatus, synchronize the time information within the selected multiplexed stream with the time information outputted from the timer of its own, and multiplex the selected multiplexed stream, the encoded stream outputted from the encoding unit of its own, and the time information.

Although not shown schematically, when the multiplexed stream outputted from the encoding apparatus in the final stage arrives at the reception side, one of the plurality of streams within the multiplexed streams is decoded selectively by a decoder and the video and voice are reproduced.

Consequently, according to the encoding system of the second embodiment, when it is desired to increase the number of videos and voices, it is sufficient to additionally provide the encoding apparatus in the post stage of the encoding apparatus in the final stage and when it is desired to decrease the number of videos and voices, it is sufficient to eliminate the encoding apparatus in the order from the encoding apparatus in the final stage, and thus, it is possible to flexibly extend and reduce the system.

Further, according to the encoding system of the second embodiment, the time information in each encoding apparatus synchronizes with another and each video and voice are reproduced based on the time information, and therefore, it is possible to prevent the videos and voices given to different encoding apparatuses from being reproduced in a shifted state (occurrence of jitter is prevented). That is, it is possible to obtain the video and voice of the same quality as that when synchronization and multiplexing of the time information is performed in one multiplexing device and the stream outputted from the multiplexing device is reproduced.

Furthermore, according to the encoding system of the second embodiment, for example, when the multiplexed stream outputted from the encoding apparatus 102 stops or when the multiplexed stream outputted from the encoding apparatus 102 is recognized to be anomalous, the multiplexed stream selecting unit 1033 of the encoding apparatus 103 selects the multiplexed stream S101 outputted from the encoding apparatus 101, and therefore, in the multiplexed stream outputted from the encoding apparatus in the final stage, the encoded stream S1021 that is obtained by the encoding unit 1021 of the encoding apparatus 102 is not included as a matter of course, but, the multiplexed stream S101 is included. That is, because the multiplexed stream selecting unit 1033 is provided, even if there occurs a failure in one of the encoding apparatuses, it is possible to include the multiplexed streams obtained in each encoding apparatus in the stages before the failed encoding apparatus in the multiplexed stream outputted from the encoding apparatus in the final stage.

For example, when there occurs a failure in both the encoding apparatus 102 and 103, the multiplexed stream obtained in the encoding apparatus 101 is no longer included in the multiplexed stream outputted from the encoding apparatus in the final stage.

Consequently, in order to prevent such trouble due to the successive failures of the encoding apparatuses, it is preferable to perform as follows.

For example, as shown in FIG. 3, each encoding apparatus after the encoding apparatus 104 selects and outputs the multiplexed stream corresponding to the smallest k among the multiplexed streams outputted from each of the (j−k)-th (here, k=1, 2, 3) encoding apparatus.

Because of the above, even if there occurs a failure in both the encoding apparatus 102 and 103, the multiplexed stream S101 from the encoding apparatus 101 is multiplexed by the encoding apparatus 104 and it is possible to include the multiplexed stream S101 in the multiplexed stream outputted from the encoding apparatus in the final stage. If the number of multiplexed streams to be inputted to the multiplexed stream selecting unit is increased as described above, the level of the measures against failures is increased. That is, it is possible to increase the number of encoded streams within the multiplexed stream outputted from the encoding apparatus in the final stage as much as possible.

Further, in the second embodiment, it assumed that the number of the encoding apparatuses is five or more. However, the number of the encoding apparatuses may be three or more. That is, the smallest encoding system includes the encoding apparatus 101, 102, and 103.

Furthermore, in the second embodiment, it may also be possible to cause the encoding apparatus 101 and 102 to have the same configuration as that of the encoding apparatus 103, that is, to cause each encoding apparatus to have the same configuration, and to leave the timer adjusting unit and the multiplexed stream selecting unit unused in the encoding apparatus 101, and to cause the multiplexed stream selecting unit of the encoding apparatus 102 to always select the multiplexed stream S101 when the multiplexed stream S101 is input.

Industrial Applicability

According to the present invention, it is possible to provide an encoding system and an encoding apparatus capable of multiplexing streams and of flexibly extending and reducing the system.

Reference Signs List 1, 2, 3, 101, 102, 103, 104, 105 . . . encoding apparatus
11, 21, 31, 1011, 1021, 1031, 1041 . . . encoding unit
12, 22, 32, 1012, 1022, 1032, 1042 . . . timer
13, 24, 34, 1013, 1024, 1035, 1045 . . . multiplexing unit
23, 33, 1023 1034 1044 . . . timer adjusting unit
1033, 1043 . . . multiplexed stream selecting unit
A1, A2, A3, A11, A12, A13, A14 . . . audio signal
D1, D2, D3, D11, D12, D13, D14 . . . data signal
S1, S2, S101, S102, S103 . . . multiplexed stream
S11, S21, S31, S1011, S1021, S1031, S1041, encoded stream
T1, T2, T3, T11, T12, T13, T14 . . . time information
V1, V2, V3, Vii, V12, V13, V14 . . . video signal

The invention claimed is:

1. An encoding system comprising:
a plurality of encoding apparatuses, which are set in order, wherein
a first encoding apparatus of the plurality of encoding apparatuses including:
a first encoding unit that encodes signals;
a first timer that outputs time information; and
a multiplexing unit that multiplexes an encoded stream outputted from the first encoding unit and the time information outputted from the first timer, to output the resultant multiplexed stream as output of the first encoding apparatus, and
an i-th (where 2≤i) encoding apparatus of the plurality of encoding apparatuses including:
an i-th encoding unit that encodes signals;
an i-th timer that outputs time information;
a timer adjusting unit that adjusts the i-th timer so that the time information outputted from the i-th timer and time information within a multiplexed stream outputted from an (i−1)-th encoding apparatus of the plurality of encoding apparatuses are synchronized with each other; and
a multiplexing unit that multiplexes the multiplexed stream outputted from the (i−1)-th encoding apparatus, an encoded stream outputted from the i-th encoding unit and the time information outputted from the i-th timer, to output the resultant multiplexed stream as output of the i-th encoding apparatus.

2. An encoding apparatus comprising:
an encoding unit that encodes signals;
a timer that outputs time information;
a timer adjusting unit that adjusts the timer so that the time information outputted from the timer and time information within a multiplexed stream input from outside are synchronized with each other; and
a multiplexing unit that multiplexes the multiplexed stream to be input, an encoded stream outputted from the encoding unit and the time information outputted from the timer, to output the resultant multiplexed stream.

3. An encoding system comprising:
a plurality of encoding apparatuses, which are set in order, wherein
a first encoding apparatus of the plurality of encoding apparatuses including:
 a first encoding unit that encodes signals;
 a first timer that outputs time information; and
 a first multiplexing unit that multiplexes an encoded stream outputted from the first encoding unit and the time information outputted from the first timer, to output the resultant multiplexed stream as output of the first encoding apparatus,
a second encoding apparatus of the plurality of encoding Apparatuses including:
 a second encoding unit that encodes signals;
 a second timer that outputs time information;
 a timer adjusting unit that adjusts the second timer so that the time information outputted from the second timer and time information within a multiplexed stream outputted from an first encoding apparatus of the plurality of encoding apparatuses are synchronized with each other; and
 a second multiplexing unit that multiplexes the multiplexed stream outputted from the first encoding apparatus, an encoded stream outputted from the second encoding unit and the time information outputted from the second timer, to output the resultant multiplexed stream as output of the second encoding apparatus, and
a j-th (where 3≤j) encoding apparatus of the plurality of encoding apparatuses including:
 a j-th encoding unit that encodes signals;
 a j-th timer that outputs time information;
 a j-th multiplexed stream selecting unit that selects and outputs a multiplexed stream corresponding to the smallest k from among multiplexed streams outputted from (j−k)-th (where k=1, . . . , n, n is not less than 2) encoding apparatus of the plurality of encoding apparatuses;
 a j-th timer adjusting unit that adjusts the j-th timer so that the time information outputted from the j-th timer and time information within the multiplexed stream outputted from the j-th multiplexed stream selecting unit are synchronized with each other; and
 a j-th multiplexing unit that multiplexes the multiplexed stream outputted from the j-th multiplexed stream selecting unit, an encoded stream outputted from the j-th encoding unit and the time information outputted from the j-th timer, to output the resultant multiplexes stream as output of the j-th encoding apparatus.

4. An encoding apparatus comprising:
an encoding unit that encodes signals;
a timer that outputs time information;
a multiplexed stream selecting unit that selects and outputs one multiplexed stream according to priority determined in advance from among a plurality of multiplexed streams input from outside;
a timer adjusting unit that adjusts the timer so that the time information outputted from the timer and time information within a multiplexed stream outputted from the multiplexed stream selecting unit are synchronized with each other; and
a multiplexing unit that multiplexes the multiplexed stream outputted from the multiplexed stream selecting unit, an encoded stream outputted from the encoding unit and the time information outputted from the timer, to output the resultant multiplexed stream.

* * * * *